United States Patent

Smith et al.

[15] 3,698,417
[45] Oct. 17, 1972

[54] KEG TAPPING DEVICE WITH AUTOMATIC GAS SHUTOFF VALVE

[72] Inventors: Vern Smith, Woodland Hills; Merton R. Fallon, Thousand Oaks; Mack S. Johnston, Rolling Hills, all of Calif.

[73] Assignee: Republic Corporation, Los Angeles, Calif.

[22] Filed: March 11, 1970

[21] Appl. No.: 18,476

[52] U.S. Cl. ...............................137/212, 222/400.7
[51] Int. Cl. .........................B65d 83/14, B67d 5/54
[58] Field of Search ............137/212; 222/396, 400.7

[56] References Cited

UNITED STATES PATENTS

| | | | |
|---|---|---|---|
| 3,352,457 | 11/1967 | Tracy | 222/400.7 X |
| 3,325,053 | 6/1967 | De Boer | 222/396 X |
| 3,327,899 | 6/1967 | Reynolds | 222/400.7 X |
| 2,061,642 | 11/1936 | Williamson | 222/396 |
| 884,017 | 4/1908 | Hadank | 137/212 X |
| 3,090,530 | 5/1963 | Peeps | 222/400.7 |
| 3,439,777 | 4/1969 | Gothberg | 222/396 X |
| 3,497,114 | 2/1970 | Johnston | 222/400.7 |
| 3,410,458 | 11/1968 | Johnston | 222/400.7 |
| 3,228,413 | 1/1966 | Stevens | 222/400.7 X |

*Primary Examiner*—Alan Cohan
*Attorney*—Le Blanc & Shur

[57] ABSTRACT

The device includes an adapter for semi-permanent securement within a keg opening and having liquid and gas passages with normally closed valves in the passages. A coupler is releasably secured to the adapter and has liquid and gas passages providing for ingress of gas under pressure through the coupler and adapter into the keg and egress of fluid under pressure from the keg through the adapter and coupler to a faucet. The coupler includes a gas shutoff valve having a piston member in the gas passage normally maintaining a ball valve spaced from its seat permitting flow of gas through the coupler. The piston, in response to gas pressure in the gas line in excess of a predetermined pressure, shifts to permit the ball to seal against its seat thereby precluding gas flow into the keg. A check valve is provided in the liquid line in the coupler to prevent backflow of liquid from a faucet through the coupler when the latter is uncoupled from the keg.

7 Claims, 9 Drawing Figures

PATENTED OCT 17 1972 3,698,417
SHEET 1 OF 4
FIG. 9
FIG. 1
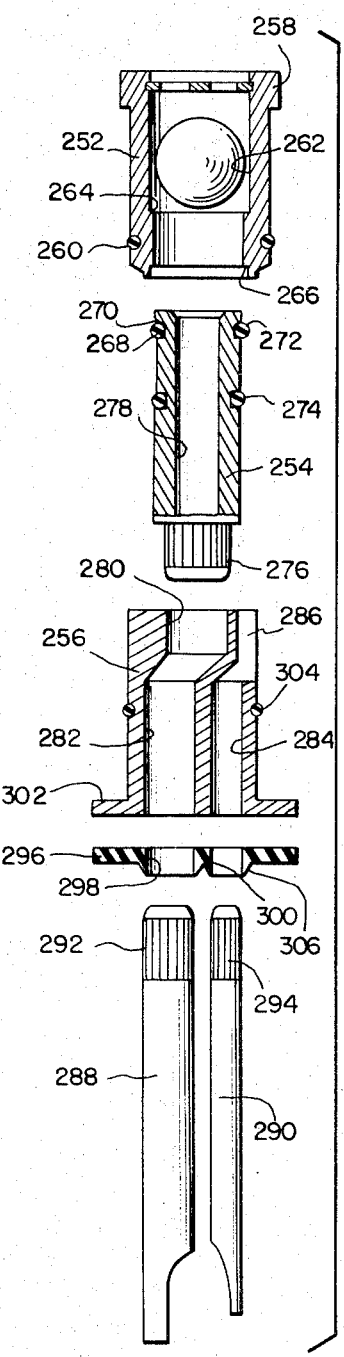
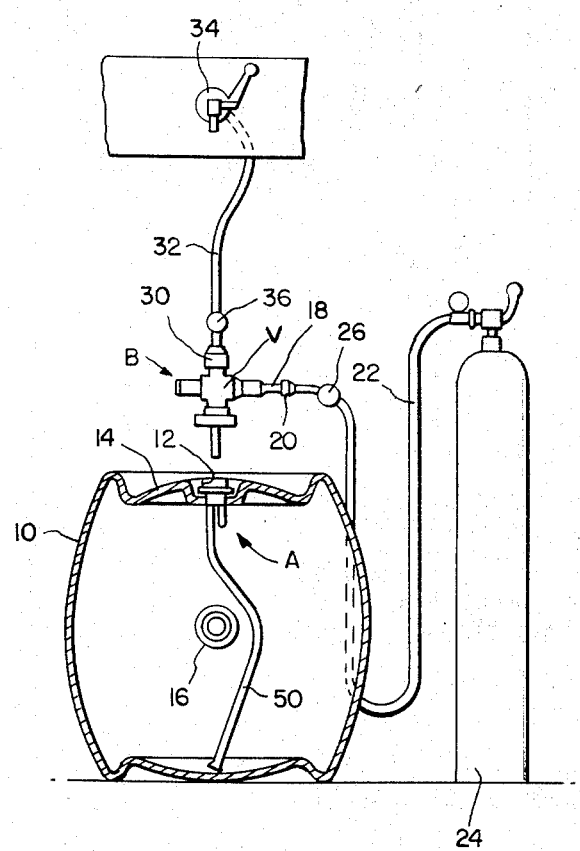
INVENTORS
VERN SMITH,
MERTON R. FALLON,
MACK S. JOHNSTON
BY *LeBlanc & Shur*
ATTORNEYS

INVENTORS
VERN SMITH,
MERTON R. FALLON,
MACK S. JOHNSTON

BY *LeBlanc & Shur*

ATTORNEYS

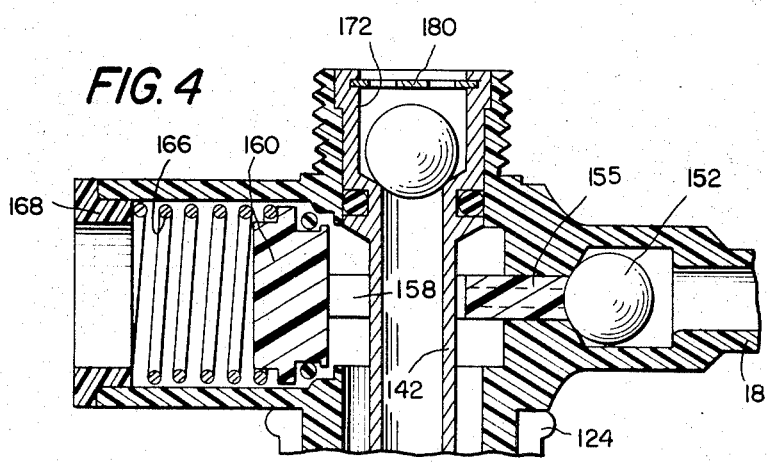
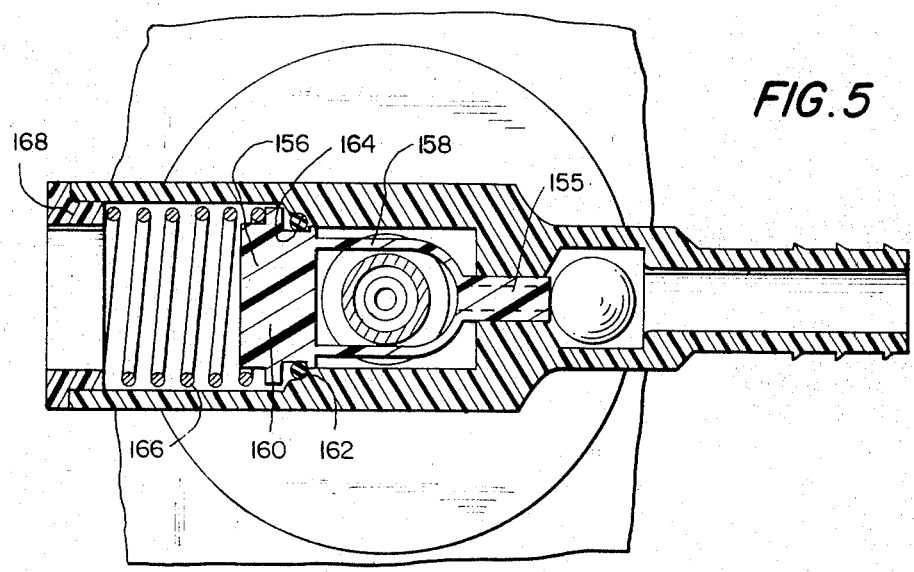
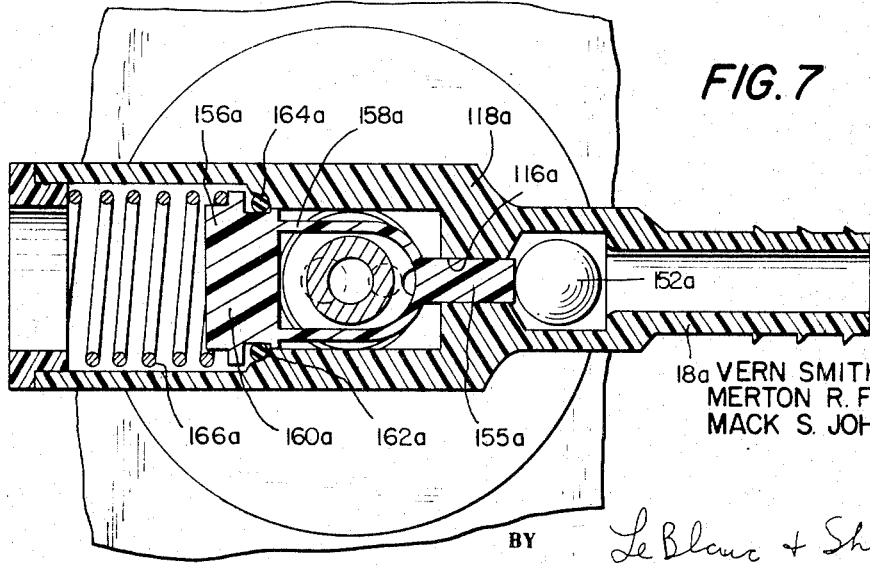

INVENTORS
VERN SMITH,
MERTON R. FALLON,
MACK S. JOHNSTON

KEG TAPPING DEVICE WITH AUTOMATIC GAS SHUTOFF VALVE

The present invention relates to a new and improved tapping apparatus for drawing liquids, such as beer, from containers, such as beer kegs or barrels, using a gas to drive the liquid from the container and particularly relates to a tapping device having an automatic gas shutoff valve for precluding ingress of high pressure gas into the keg whereby the keg pressure can be maintained within safe limits.

As has occurred in the past, failure of a fluid pressurization system in a keg or like container tapping system has resulted in large surges of highly pressurized gas through the tapping system into the keg. Keg overpressurization beyond safe limits can and has culminated in an explosion of the keg. Because of the variety of keg or container sizes, designs, materials of construction, histories of use and abuse, states of structural fatigue, a precise maximum safe internal pressure has been difficult to determine. Also, the degree of hazard associated with a structural failure of the keg or container varies with the degree to which the liquid has already been drawn from the keg, i.e., the quantity of remaining gas volume. An internal pressure of 60 psi gauge is generally considered the maximum safe upper limit.

There are two sources of keg pressurization, (1) internally generated pressure resulting from the evolution of $CO_2$ gas normally dissolved in the beer and (2) the gas pressure supplied through the tapping system from an external source. The first is not considered as a source of keg over-pressurization as extreme temperatures, unlikely to occur, would have to be obtained before the maximum safe pressure could be realized. The more common danger of keg explosion is a result of the use of high pressure $CO_2$ bottles as the gas pressurization source.

It has been found that excessive pressure in systems utilizing the $CO_2$ bottle are caused by (a) mechanical failure of the pressure regulator to shut off completely when a predetermined pressure is obtained and (b) full open mechanical failure of the regulator which usually results from structural failure of the pressure diaphragm. Excessive pressure can also be caused by human failure in turning the regulator adjustment in the wrong direction or by inverting the $CO_2$ bottle. In regulators, the most prevalent cause of failure is contamination resulting from beer backed up into the gas feed line during tapping. Thus, in those systems wherein the beer has backed up, the beer contaminates and corrodes the valve oftentimes in a manner precluding full shutoff. Full open failure of the regulator has also occurred. An appreciation of the consequences of such a failure can be obtained by noting that a conventional and commonly employed $CO_2$ bottle in tapping beer kegs and the like is capable of dumping its full capacity of gas under pressure, for example, in certain instances about 900 psi gauge into a keg in less than one second. It has been found in actual tests that a half-barrel keg in poor condition and 90 percent full would rupture under the foregoing conditions approximately 0.9 seconds after failure of the regulator and that the same keg 10 percent full would rupture in approximately 8 seconds.

Pressure relief devices have been provided in tapping units in the past purportedly for the purpose of dumping the excess gas, when a failure occurs, before the maximum safe pressure of the keg is exceeded. For example, a pressure relief valve has been provided in the coupler of the tapping assembly described and illustrated in U.S. Pat. No. 3,228,413. However, it has been found, after stringent examination of this type of valve and its operation, that overpressurization of the keg beyond the maximum safe keg pressure is, in fact, not prevented. The relief valve has been found to be ineffective as (1) its orifice is simply not large enough to dump the pressure quickly enough to preclude overpressurization of the keg beyond the maximum safe pressure, (2) the spring which biases the valve structure into a closed position actually decreases the orifice size in response to increasing pressure due to the closing of the coils, and (3) the pressure at which the relief valve opens changes due to setting of the O-ring seal over the course of use of the coupler. As a result, the pressure relief valve has been found to be unsatisfactory.

According to the present invention, an automatic gas shutoff valve is provided in the tapping assembly to positively preclude ingress of overpressurized gas through the tapping system into the keg. Particularly, the shutoff valve includes a pressure sensing mechanism which, when a pressure is obtained in excess of a predetermined pressure, shuts off the gas flow to the keg. The valving device is precisely calibrated and has been found to be reliable and repeatable at the calibrated pressure irrespective of use or non-use.

Another feature of the present invention is the provision of the gas shutoff valve in both single and dual probe type tapping units. The valve parts, as well as certain of the parts of the tapping units, are common to both types, resulting in decreased costs of manufacture.

Accordingly, it is a primary object of the present invention to provide a tapping device for beer kegs or the like including an automatic gas shutoff valve for precluding overpressurization of the keg.

It is also an object of the present invention to provide an automatic gas shutoff valve for beer kegs and the like which is reliable, efficient, and repeatable in operation at precise predetermined pressures.

It is another object of the present invention to provide an automatic gas shutoff valve for use with keg tapping units of either the single probe or dual probe type.

It is a further object of the present invention to provide a check valve in the liquid outlet line of the coupler to preclude backflow of liquid from the faucet through the coupler upon disassembly of the coupler from the keg adapter.

These and further objects and advantages of the present invention will become more apparent upon reference to the following specification, claims, and appended drawings, wherein:

FIG. 1 is a schematic view illustrating a keg tapping device employing the automatic gas shutoff valve hereof as installed in a beer tapping system, including a keg, the keg being broken away and in cross section for ease of illustration;

FIG. 4 is a fragmentary vertical cross sectional view of the automatic gas shutoff valve illustrated in a closed position;

FIG. 5 is a cross sectional view taken about on line 5—5 of FIG. 2;

FIG. 7 is a cross sectional view thereof taken generally about on line 7—7 of FIG. 6;

FIG. 9 is a vertical cross sectional view of certain of the coupler parts for use in the tapping device of FIG. 6, the parts being illustrated in exploded juxtaposition.

Figure 2:
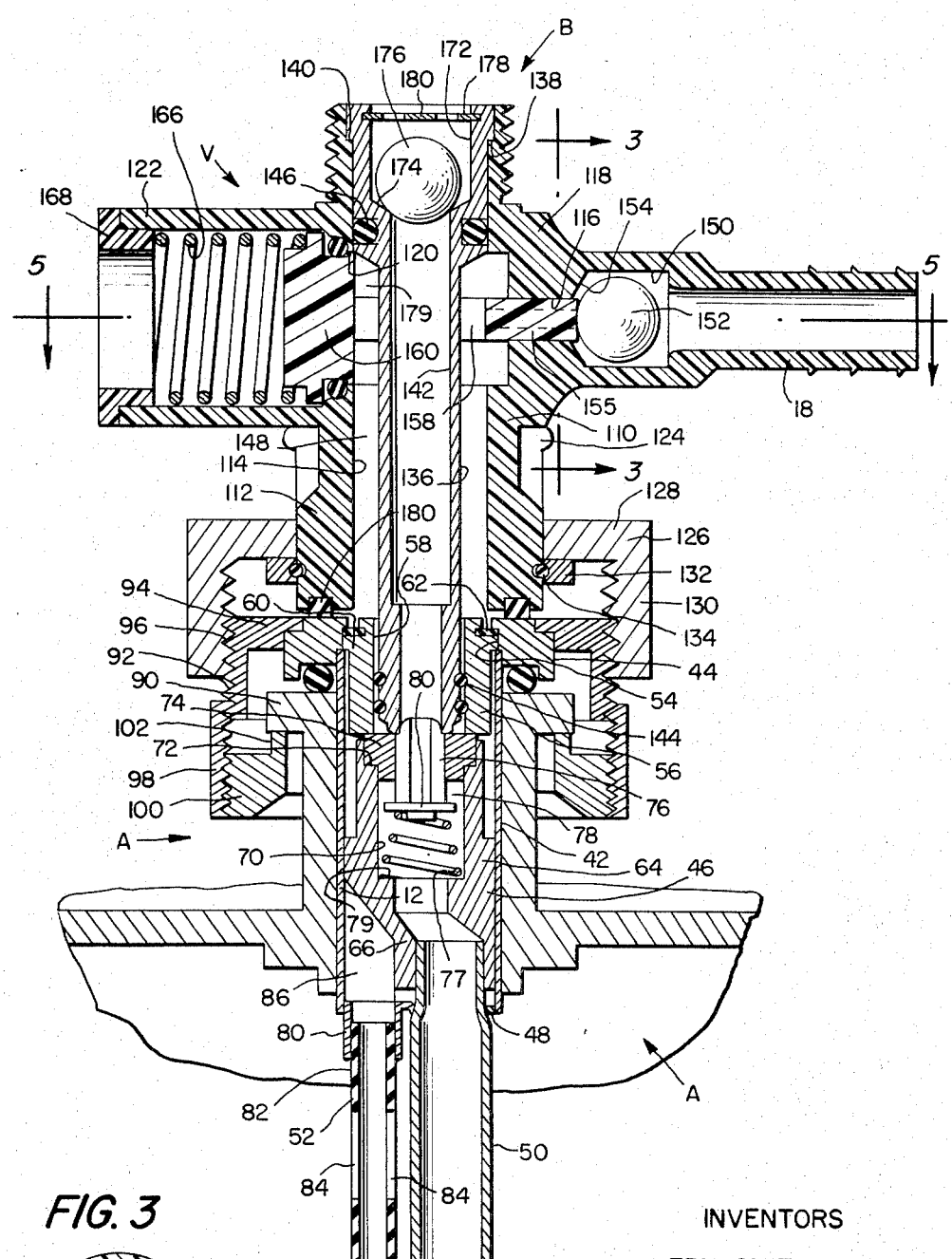
FIG. 2 is a vertical cross sectional view through a portion of the tapping device hereof illustrating its details as well as details of the automatic gas shutoff valve.

Referring now to the drawings, and particularly to FIG. 1, there is schematically shown a conventional beer keg 10 of the so-called "Peerless" type having an opening 12 in its top wall 14, in which opening there is semi-permanently secured at the brewery an adapter unit A. A normally closed filling opening 16 is provided in the sidewall of keg 10. A coupler unit B containing the automatic gas shutoff valve, generally indicated V, is readily and releasably connected with keg adapter A at the beer dispensing establishment to form a tapping assembly for keg 10 as hereinafter amplified. Coupler unit B has a gas inlet port 18 adapted to receive a coupler 20 at the end of a gas supply tube 22 which conventionally communicates with a pressurized gas or $CO_2$ supply tank 24. If desired, a valve 26 of conventional type may be provided for gas control at keg 10. Coupler unit B also has a beer exit port, threaded as at 28 in FIG. 2, to receive a coupling 30 on the end of flexible beer supply line 32 for supplying beer from keg 10 through the tapping and coupler units A and B to conventional faucet 34. If desired, a suitable valve 36 may also be disposed in beer line 32. The arrangement of FIG. 1 is shown mainly for the purpose of illustrating usage of the present invention and further description thereof except for the units A and B and the automatic gas shutoff valve V is not believed necessary.

Referring now particularly to the embodiment hereof illustrated in FIG. 2, the coupler and adapter units are of the single probe type, whereas the coupler and adapter units in the embodiments hereof illustrated in FIGS. 6–9 comprise a dual probe type tapping assembly. Referring first to the single probe key adapter A illustrated in FIG. 2, this adapter is fully described and illustrated in U.S. Letters Pat. No. 3,497,114, issued Feb. 24, 1970, the disclosure of which patent is herein incorporated by reference thereto as though fully set forth herein. Particularly, keg adapter A comprises a tubular sleeve 42 and an upper cylindrical ring or flange 44 secured about the upper end of sleeve 42, a valve housing 46, a lower closure plate 48, the foregoing forming an adapter body, a siphon tube 50, and a gas check valve 52. Ring 44 is internally grooved as at 54 and a polygonally shaped, preferably square, insert 56 is received in the upper end of the adapter body. Insert 56 is centrally bored at 58 and is cut back along its outer edges adjacent opposite ends to form a plurality of shoulders 60 along the apices of its edges. Ring 44 includes an inwardly extending flange having a plurality of notches, not shown, whereby insert 56 is received within the opening of the adapter body with shoulders 60 seating against the upper end of sleeve 42. A snap ring 62 lies in groove 54 to retain insert 56 in the adapter body, as described in the aforementioned patent. Valve housing 46 is preferably formed from hex bar stock and has an intermediate hex-shaped portion 64 which defines with sleeve 42 a plurality of passages extending in an axial direction. Housing 46 includes a lower eccentrically extending portion 66 which is bored to receive the upper end of siphon tube 50. Valve housing 46 is centrally bored at 70 adjacent its upper end and is also stepped as at 72 to receive a complementary chuck washer 74. Washer 74 has a central aperture and receives the bifurcated portion 76 of a liquid valve 78. The bifurcated portion 76 extends from a valve plate 80 which normally seals against the annular lower surface of chuck washer 74 by the pressure of a spring 77 which engages between plate 80 and a shoulder 79 in valve housing 46. Closure plate 48 closes off the lower end of sleeve 42 and includes a depending nipple 80 in which is received in the upper end of an elongated flexible tube or envelope having a D-shaped cross section and which comprises gas check valve 52. Tube 82 is preferably formed of silicon rubber and may be adhesively secured within nipple 80. The lower end of tube 82 is preferably closed and an elongated slit 84 is formed in each of the curved outer and flat inner vertical walls of tube 82. The slits permit gas under pressure to pass outwardly of check valve 52 into the interior of keg 10 and prevent either gas or liquid from flowing from the keg through the gas passage to be described in adapter A. A detailed description of gas check valve 52 is provided in copending application Ser. No. 814,883, filed Mar. 26, 1969, the disclosure of which is incorporated herein by reference thereto as though fully set forth herein.

As seen in FIG. 1, siphon tube 50 extends from the lower end of the adapter body to adjacent the bottom of the keg. By the foregoing structure, it will be appreciated that normally closed liquid and gas passages are thus provided through adapter A. Particularly, the gas passage includes the openings between polygonal insert 56 and the walls of sleeve 42, the passage between the walls of sleeve 42 and the upper portion of valve housing 46, the passages between the flat sides of the hex-shaped intermediate portion 64 of housing 46 and sleeve 42, the eccentric chamber identified at 86 in FIG. 2 in the lower end of the adapter body, and the slits 84 in gas check valve 52. The liquid passage includes the siphon tube 50, the passage through valve housing 46 past valve plate 80 when open, the central aperture in chuck washer 74, and the central bore 58 of insert 56.

Keg adapter A is releasably secured in the standard opening 12 of keg 10 by means cooperable with the flange or collar 90 of the keg about opening 12, preferably in the manner disclosed in U.S. Letters Pat. No. 3,422,448, issued Jan. 14, 1969. Briefly, the securing means includes a ring 92 having an inwardly extending upper flange 94 for engaging over the stepped ring 44 of the adapter body. Ring 92 is externally threaded, as at 96, and has a lower depending diametrically enlarged internally threaded portion 98. A ring 100 including a pair of upwardly projecting diametrically opposed lugs 102 for seating under flange 90 is snapped over keg flange 90 so that ring 100 rests on the top wall 14 of keg 10 with the lugs 102 extending upwardly. After the keg adapter A is inserted within keg 10, collar 92 is placed over the upper end of the adapter body and threaded onto ring 100 whereby ring 100 is drawn up within the collar 92 with lugs 102 seating against the underside of keg flange 90 to clamp the adapter ring 44 and keg neck flange 90 between the flange 94 on collar 92 and the ring 100.

Referring now to coupler unit B, there is provided a generally cylindrical body 110 which is externally threaded at its upper end at 28 and has a slightly diametrically enlarged lower end portion 112. A bore 114 extends vertically through body 110 and lies in open communication with a laterally extending passage 116 formed through a nipple 118 projecting laterally from one side of body 110 intermediate its ends. An enlarged opening 120 is formed in body 110 at a position diametrically opposite passage 116, the opening 120 and passage 116 being provided for reasons that will become apparent. Body 110 includes a laterally projecting cylindrical housing 122 coaxially arranged about opening 120. Body 110 also includes a plurality of projections 124 which provide an upper stop for retaining a collar 126 about the lower end portion 112 of body 110. Collar 126 includes an inwardly extending flange portion 128 and a depending internally threaded skirt 130. Collar 126 is loosely secured to coupler B and is retained about lower end portion 112 of body 110 by a retainer ring 132 secured to body portion 112 by a split ring 134.

Received within bore 114 is a cylindrical sleeve 136 having an upper end flange 138 for seating on an annular shoulder 140 of body 110. Sleeve 136 has a central passage 142 and extends beyond the lower end of coupler body 112 to form a depending, centrally disposed, probe. A pair of O-rings 144 are disposed about the lower end of the probe for purposes to be described. An O-ring seal 146 is provided about the upper end portion of sleeve 136 for sealing about the upper portion of bore 114 above the annular passage 148 defined between sleeve 142 and the walls of body 110 about bore 114 and the chamber 179 defined by the walls of body 110 about bore 114 and certain structure of the valve V to be described.

Figure 3:
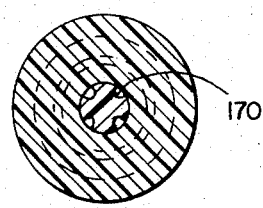
FIG. 3 is a cross section thereof taken generally about on line 3—3 of FIG. 2.

Nipple 118 of body 110 includes a chamber 150 housing a freely movable ball 152 which forms a portion of the automatic gas shutoff valve V hereof. The inner end of chamber 150 forms a conical seat 154 against which ball 152 seats when excessive pressure is supplied in gas supply line 22. Ball 152 is normally maintained in a position spaced from seat 154 by a stem 155 which is slidably received in passage 116. Stem 155 forms a portion of a valve actuating element 156 which includes a pair of laterally spaced legs 158 connecting between stem 155 and a piston 160 disposed within opening 120 on the opposite side of body 110. Piston 160 is grooved about its edge to receive an O-ring 162 which, in the valve closed position, seals against a shoulder 164 about opening 120. Piston 160 is maintained in the normally sealing position by a spring 166, the inside end of which seats against the outer face of piston 160. The opposite end of spring 166 seats against an annular stop 168 which may be bonded by suitable epoxy within the outer end opening of housing 122. To provide a normally unobstructed gas passage from inlet 18 past ball 152 and stem 155 into chamber 179 for normal operating conditions, stem 155 is longitudinally fluted at 170 in FIG. 3. Accordingly, with the outer end of stem 155 projecting into chamber 150 slightly beyond seat 154, ball 152 is maintained in spaced relation from seat 154 whereby gas under pressure entering inlet 18 under normal operating conditions flows about ball 152 and along the flutes 170 on stem 155 for ingress into chamber 179 and annular passage 148.

To secure coupling unit B to keg adapter A (the latter being secured within keg opening 12 in the manner previously described) and thereby tap the keg, the probe or lower end of sleeve 136 is inserted within the central opening 58 of insert 56 in keg adapter A. Collar 126 is threaded down about the externally threaded portion 96 of collar 92 drawing coupler unit B downwardly into butting relation against the adapter body, a sealing ring 180 on the lower end of coupler body 110 sealing against ring 44. O-rings 144 seal about opening 58 in insert 56 and, prior to the time coupler B is secured to adapter A, the lower end sleeve 136 engages the upper end of the bifurcated valve portion 76. Upon downward displacement of coupler unit B relative to adapter unit A by the threading action of collar 126 about ring 92, sleeve 136 displaces valve plate 80 inwardly away from chuck washer 72 to open the liquid valve and provide communication between the liquid passages in the coupler and adapter.

When the coupler is secured to the adapter, the passages between sleeve 42 and insert 56 in the adapter lie in communication wit passage 148 in the coupler. Thus, a gas passage is provided through coupler B and adapter A into keg 10 and comprises the inlet 18, chamber 150, the fluted portions 170 of stem 155, chamber 179, passage 148, the passages between insert 56 and the cylindrical walls of sleeve 42, the passages about housing 46, including the passages between the hex portion 64 and sleeve 42, and check valve 52. When the gas pressure in the gas passages exceeds the internal keg pressure, slits 84 open permitting ingress of gas through the aforementioned gas passages into the keg. The liquid passage through the tapping unit includes the liquid passage through keg adapter A as previously described and the central passage 142 in sleeve 136.

It is a further particular feature hereof that there is provided a check valve in fluid passage 142 of coupler B to preclude backflow of beer from the faucet through coupler B when the latter is removed from the adapter. To this end, the upper end of bore 142 is diametrically enlarged as at 172 and forms a conical valve seat 174. A ball 176 is received within enlarged portions 172 and retained within the chamber defined thereby by a split ring 178 having a central leg 180. As will be apparent, ball 176 is free in chamber 172 and seals under nonflow conditions through passage 142 against seat 174. When the faucet is open, beer under pressure will flow through the aforementioned beer passages and will unseat ball 176 from seat 174 to permit outflow of beer from passage 142 about ball 176 into the beer line 32 for dispensing at faucet 34.

Should the regulator at the gas pressure source fail or should some other malfunction occur in the gas pressurization system whereupon partial or full pressure of the gas contained in bottle 24 is supplied through line 22 to the tapping device, it is a particular feature hereof that the gas shutoff valve V automatically closes in response to a pressure above a predetermined pressure in chamber 179 to preclude ingress of gas through passage 148 and the aforementioned gas passage in adapter A into the keg. This precludes excessive pressure from reaching the keg and prevents buildup of pressure beyond the maximum safe pressure, i.e., about 60 psig which might otherwise result in an explosion of the keg. To this end, when the gas pressure in excess of the predetermined pressure is applied against the face of piston 160, the valve actuating element, together with stem 155, is displaced to the left as seen in FIG. 2 against the bias of spring 166. When fully displaced as illustrated in FIG. 4, the end of stem 155 in chamber 150 is disposed wholly within passage 16 whereby the gas pressure displaces and seats ball 152 against valve seat 154. The inlet gas passage through flutes 170 is thus sealed whereby the gas is prevented from entering the keg through the gas passages in the coupler and adapter. Also, the gas passages in the coupler and adapter are vented by the displacement of the piston 160 as illustrated in FIG. 4.

Figure 6:
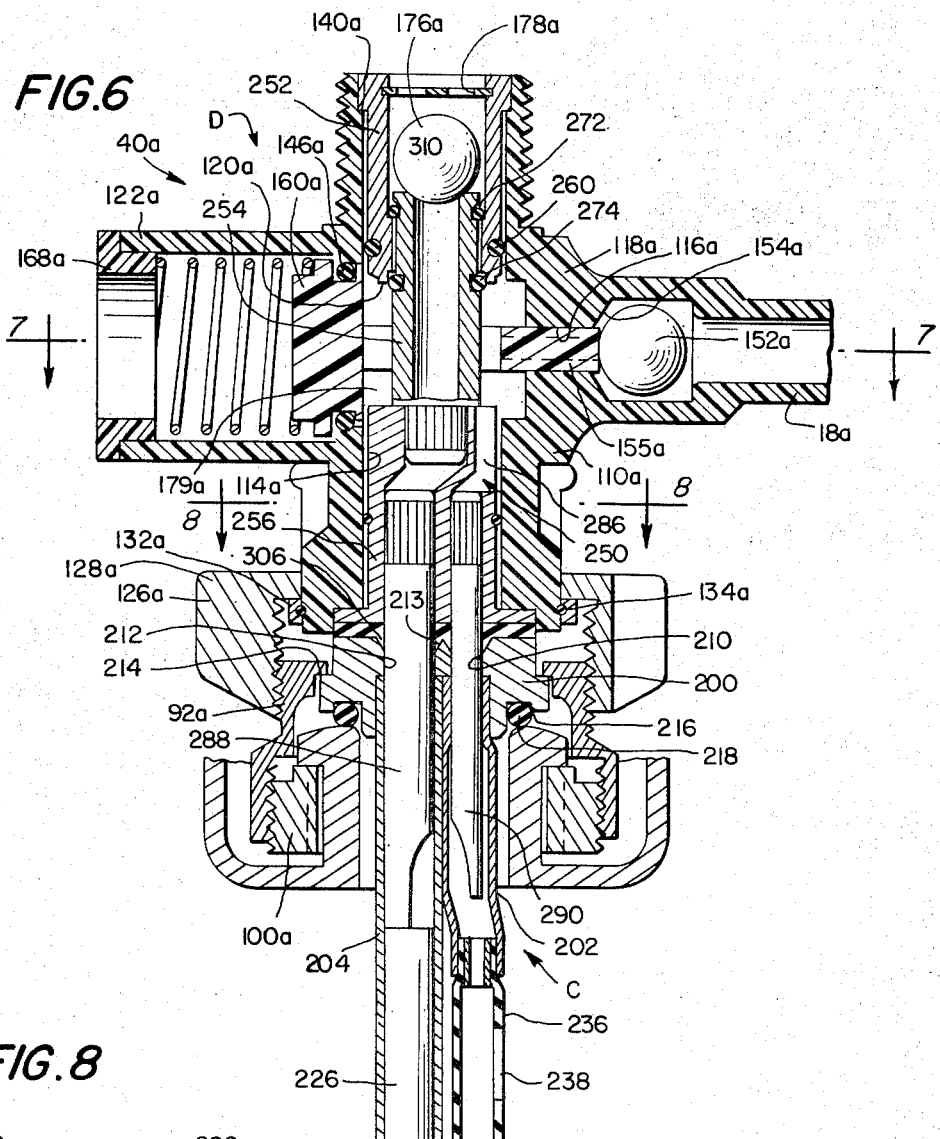
FIG. 6 is a vertical cross sectional view of another form of tapping device hereof and illustrating the automatic gas shutoff valve as employed in such device.
Figure 8:
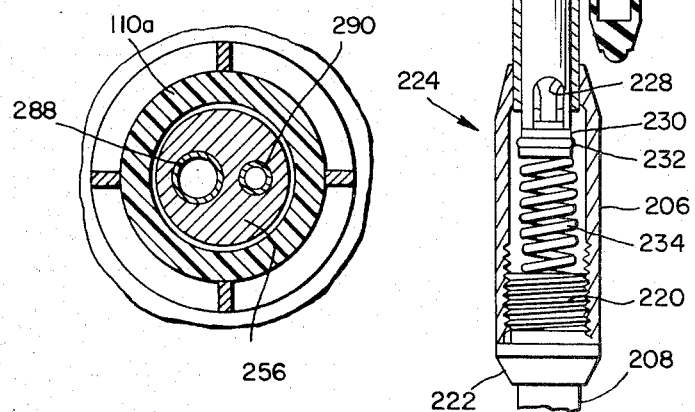
FIG. 8 is a cross sectional view thereof taken generally about on line 8—8 of FIG. 6.

Referring now to the embodiment hereof illustrated in FIGS 6–9, there is disclosed a keg adapter and coupler unit C and D, respectively, of the dual probe type, the coupler therefor incorporating the automatic gas shutoff valve V of the present invention. The keg adapter C in FIG. 6 is identical to the keg adapter described and illustrated in copending application, Ser. No. 864,448, filed Oct. 7, 1969 by Mack S. Johnston the disclosure of which is incorporated herein by reference thereto as though herein fully set forth. Particularly, keg adapter C includes an adapter body having a ring-like flange 200, a pair of tubular members 202 and 204 providing respective liquid and gas passages, a tubular housing 206, and a siphon tube 208. Ring 200 is provided with a pair of bores 210 and 212, the axes of the bores being offset from the central axis of the adapter body. The lower end portions of the bores are diametrically enlarged to receive the upper ends of tubes 202 and 204. The outer face of ring 200 is stepped to provide an annular shoulder 214 for purposes as will become clear. The underside of ring 200 is provided with a recess 216 for receiving an O-ring 218. The intermediate portion of tube 202 is diametrically enlarged and secured preferably by brazing to tube 204 whereby the tubes mutually reinforce one another.

The upper end of tubular housing 206 is suitably secured to the lower end or tube 204. The lower end of housing 206 is internally threaded to receive the externally threaded portion 220 of a locking nut 222. The siphon tube 208 may extend from the keg adapter C into a keg similarly as siphon tube 50 lies within keg 10 in FIG. 1.

A liquid valve, generally indicated 224, is provided in the liquid passage formed by siphon tube 208, housing 206, tube 204 and adapter flange or ring 200. Liquid valve 224 includes a tubular sleeve 226 within tube 204, the upper end of sleeve 226 being inset from the upper end of adapter C. Recesses 228 are formed through the walls at the lower end of sleeve 226 and a valve body 230 is secured to the inner end of sleeve 226. Valve body 230 includes a cylindrical member having an O-ring seal 232 which, when the valve is closed, seats against the lower end of tube 204 to form an effective fluid seal thereabout. Valve 224 is maintained in a normally sealed position by a coil spring 234 which engages between the lower end of valve body 230 and the upper end of siphon tube 208. It will be appreciated that axial inward movement of sleeve 226 displaces O-ring 232 away from its seat against the bias of spring 234 to provide a fluid passage from the interior to the exterior of the keg through siphon tube 208, housing 206, past the open valve and through sleeve 226 and tube 204.

Turning now to the gas passage through adapter C, the lower end of tube 202 is swaged to form a D-shaped cross section laterally outwardly offset from tube 204. A gas check valve of the type previously described is disposed at the lower end of tube 202. It will be appreciated that when gas under pressure is transmitted through tube 202 into gas check valve 236, the sides of the slits 38 will open permitting gas to flow outwardly into the keg. As will be appreciated, when the gas pressure within the keg is equal to or greater than the gas applied through the keg adapter, the external pressure within the keg maintains slits 238 closed precluding ingress of liquid from the keg through the slits into the tubular passage 202.

Keg adapter C is secured within keg opening 12 by utilizing the locking rings 100a and 92a similar to the locking rings 100 and 92 described in connection with the previous embodiment. Further description is therefore not believed necessary and the parts of the securing means in FIGS. 6 are denoted by like reference numerals as applied to like parts in FIGS. 1–5 followed by the letter a.

The coupler D includes an outer body which is identical to the coupler body 110 described in the previous embodiment, like parts thereof in FIG. 6 having like reference numerals followed by the letter a. It will be appreciated that the automatic gas shutoff valve is structurally identical to and functions similarly as the gas shutoff valve V illustrated in the embodiment of FIGS. 1–5 and that further description thereof is unnecessary, again the parts thereof in FIGS. 6–8 having identical reference numerals to like parts in the previous embodiment and followed by the letter a.

Disposed within the coupler bore 114a is an elongated composite sleeve structure, generally indicated 250, which, as best illustrated in FIG. 9, comprises an upper sleeve 252, an intermediate sleeve 254, and a lower transition member 256. Upper sleeve 252 has an outwardly projecting flange 158 for seating, in final assembly, on an annular shoulder 140a of housing body 110a. *Upper sleeve 252 also includes a lower O-ring seal 260 for engaging bore 114a and an axially stepped bore 262 forming a shoulder 264 for purposes to be described. The lower end of bore 262 is diametrically enlarged as at 266.

Intermediate sleeve 254 includes a groove 268 adjacent its upper end which groove also includes an outwardly beveled surface 270, groove 268 receiving an O-ring retainer 272. Sleeve 254 is also grooved intermediate its ends, the groove receiving O-ring seal 274. The lower end 276 of sleeve 254 is reduced in diameter and knurled. Sleeve 254 has a central bore 278 and is of a diameter to be received within the lower portion of bore 262 of upper sleeve 252 in a manner to be described.

Lower transition member 256 has a central bore 280 at its upper end in communication with a radially offset bore 282 opening through its lower end. Another radially offset bore 284 opens through the lower end of member 256, the axes of bores 282 and 284 lying on a common diameter on opposite sides of the axis of member 256. An upper edge portion of member 256 is cut away at 286 and lies in communication with the upper end of offset bore 284.

A pair or probes 288 and 290 are received within bores 282 and 284, respectively, the probes having knurled portions 292 and 294 adjacent their upper ends for securement within the respective bores 282 and 284 in conjunction with a suitable epoxy. Probes 288 and 290 have axial passages therethrough and, when secured to transition member 256, lie in communication with bore 280 and cutout 286, respectively.

The primary purpose of providing a multi-part sleeve structure 250 is to facilitate its securement within body 110a conjunctive with the automatic gas shutoff valve. To assemble the parts with the automatic gas shutoff valve disposed within housing 110a as illustrated in FIG. 6, upper sleeve 252 is inserted within the upper end of valve body 110a. The reduced lower end 276 of intermediate sleeve 254 is inserted and secured as with a suitable epoxy within bore 280 of transition member 256. Likewise, the probes 288 and 290 are inserted and secured within the bores 282 and 284 and a rubber gasket 296 having a pair of eccentric openings 298 and 300 for receiving probes 288 and 290, respectively, is disposed about the bores against the lower end of transition member 256, the latter also including an outwardly projecting flange 302. This subassembly, i.e., the intermediate sleeve 254, transition member 256, and probes, is then inserted into the lower end of body 110a with intermediate sleeve 254 being received within the opening in the valve actuating element formed by piston 160a, legs 158a, and stem 155a. The upper end of intermediate sleeve 254 is received within the lower end of upper sleeve 252 and, retainer O-ring 272 is of a diameter, when seating in the enlarged portion of groove 268, to permit passage of the upper end of sleeve 254 through the reduced diameter portion of bore 262 in sleeve 252. When retainer ring 272 is located above shoulder 264 of sleeve 252, the ring expands and separating movement of sleeve 254 from sleeve 252 is precluded as ring 272 is forced to expand against the beveled surface 270 and lock against shoulder 264. O-ring 274 seats against the lower shoulder 266 of sleeve 252 in final assembly. O-ring seal 304, about transition member 256, seals in final assembly about bore 114a on the opposite side of chamber 179a. In this manner, the composite sleeve structure 250 is secured within body 110a and coupler D can now be releasibly secured in a tapping position with keg adapter C.

To tap the keg the probes 288 and 290 are inserted in the respective tubes 204 and 202 and collar 128a threadedly engages about the collar 92a to draw the coupler D downwardly against key adapter C. It will be appreciated that as the coupler is threaded down about adapter C, the projecting beveled portions 306 of seal 296 about probes 288 and 290 are received within the corresponding chamfered surfaces 213 about the openings is adapter flange 200 to form a seal prior to full threaded engagement of coupler D to adapter C. This substantially precludes spitting of beer during the tapping procedure, i.e., the opening of the liquid prior to full securement of coupler D to adapter C. It will be appreciated that the lower end of probe 288 engages the upper end of sleeve 226 when the coupler D is coupled to the adapter C. Upon threading the coupler onto the adapter, probe 288 displaces sleeve 226 axially inwardly to space O-ring seal 232 of liquid valve 224 from its seat about the lower end or tube 204, thereby providing liquid passage from the keg through the siphon tube 208, the open valve, sleeve 226 and tube 204, the passage in probe 288, bore 278, and bore 262 in upper sleeve 252. An inlet gas passage is also provided when coupler D is secured to adapter C comprising nipple 18a, the fluted portions of stem 155a, the annular chamber about intermediate passage 254, the cutout 286 in transition member 256, the probe 290, and the slits 238 in check valve 236.

It will be appreciated that a beer check valve similar to the check valve previously described is disposed in the upper end of sleeve 252. Particularly, ball 176a is disposed within enlarged bore 262 and a retaining ring 178a is secured in a groove about the upper end of bore 262. Ball 176a seats against a conical surface 310 formed in the upper end of intermediate sleeve 254 about bore 278. Consequently, as the liquid is driven from the keg through the liquid passages described, the ball 176a is unseated from surface 310 to permit liquid to pass about ball 176a and outwardly through retainer ring 178a for dispensing at faucet 34.

It will thus be appreciated that the objects of the present invention have been fully accomplished in that there has been provided an automatic gas shutoff valve for a tapping unit which reliably and repeatedly operates in response to a predetermined pressure in the gas inlet line to preclude communication between the keg and the gas pressure source in the event of a failure in the regulator or other type of failure at the gas source. Furthermore, there has been provided an automatic gas shutoff valve in connection with the tapping unit hereof which precludes backflow of the beer from the faucet out of the coupler when the latter is detached from the keg, as when the keg is untapped.

It will be appreciated that the automatic gas shutoff valve disclosed herein can also be utilized in the tapping device described and illustrated in copending application, Ser. No. 889,485, filed Dec. 31, 1969, which tapping device is adapted for use with the so-called "Golden Gate" tapping system having the enlarged key tapping opening. The disclosure of application, Ser. No. 889,485 is incorporated herein in its entirety by reference thereto as if fully set forth herein. As will be appreciated from the foregoing description of the automatic gas shutoff valve, the coupler body 110 illustrated in FIG. 6 of that application can be modified to incorporate the structure of valve V disclosed herein simply by providing a nipple 118 with its associated chamber 150, ball 152 and inlet 18 on one side or body 110 in that application in lieu of inlet arm 118 thereof. Also, housing 122 and its associated piston 160 and spring 166 can be provided on the opposite side of body 110 in that application with the legs 158 herein of the movable valve element straddling probe 124 in FIG. 6 of Ser. No. 889,485. The gas flowing into coupler head 110 in Ser. No. 889,485 would then flow past the normally open automatic gas shutoff valve into the annular passage between probe 124 and bore 122 in Ser. No. 889,485 and then through the adapter A in the manner disclosed therein. The gas shutoff valve would operate identically as previously described herein.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A liquid dispensing coupler for use in tapping a keg or like container comprising a coupler head having discrete liquid and gas passages therethrough, said liquid passage and said gas passage being separated one from the other, and a normally open gas shutoff valve in said gas passage including means responsive to a predetermined gas pressure in said gas passage for closing said shutoff valve and sealing said gas passage, said coupler including a centrally disposed sleeve, one of said liquid and gas passages extending at least in part in said sleeve, said shutoff valve including a member on one side of said coupler responsive to the gas pressure in said gas passage and movable from a first position into a second position in response to a predetermined gas pressure in said gas passage, a valve element on the other side of said coupler and in said gas passage, said element being movable between a valve open position and a valve closed position, means for coupling said member and said element including a connecting part straddling said sleeve, said member in said first position maintaining said element in said valve open position, said element being movable into said valve closed position in response to movement of said member from said first position to said second position.

2. A liquid dispensing coupler for use in tapping a keg or like container comprising a coupler head having discrete liquid and gas passages therethrough, said liquid passage and said gas passage being separated one from the other, and the normally open gas shutoff valve in said gas passage including means responsive to a predetermined gas pressure in said gas passage for closing said shutoff valve and sealing said gas passage, said coupler including a check valve in said liquid passage for preventing backflow of liquid through said coupler.

3. A coupler according to claim 2 including a probe forming a portion of said liquid passage therethrough, said coupler having a generally cylindrical head with said probe extending generally coaxially therewith, said gas passage being radially offset from the axis of said coupler head.

4. A coupler according to claim 3 wherein the keg has an opening and in combination with a keg adapter having an axis and adapted for semi-permanent securement in the keg opening, said adapter having segregated gas and liquid passages, means for releasably coupling said coupler and said keg adapter together with the liquid and gas passages thereof in respective communication one with the other for the respective transfer of liquid from the inside to the outside of the keg and gas from the outside to the inside of the keg, and normally closed valves in the liquid and gas passages of said adapter.

5. A coupler according to claim 4 wherein said adapter has a central opening forming a portion of said liquid passage, said coupler head having a central depending probe with a passage therethrough forming a portion of said liquid passage and receivable within said central opening when said coupler and adapter are secured one to the other.

6. A coupler according to claim 4 wherein said adapter has a pair of openings laterally offset from the axis thereof and forming a part of the respective gas and liquid passages therethrough, said coupler including a pair of depending probes forming portions of the respective liquid and gas passages through said coupler, said coupler head being generally cylindrical with the axes of said probes extending generally parallel to the axis of said head and laterally offset therefrom.

7. The coupler and keg adapter according to claim 4 in combination with a source of gas under pressure, gas passage means connecting said gas pressure source and the gas passage in said coupler and including means for supplying gas to said coupler at normal operating pressures lower than the pressure of the gas at said gas source, and means for maintaining said shutoff valve normally open at said normal operating pressures and responsive to pressures in said gas passage exceeding said normal operating pressures for closing said shutoff valve.

* * * * *

UNITED STATES PATENT OFFICE
CERTIFICATE OF CORRECTION

Patent No. 3,698,417  Dated October 17, 1972

Inventor(s) Vern Smith, Merton R. Fallon and Mack S. Johnston

It is certified that error appears in the above-identified patent and that said Letters Patent are hereby corrected as shown below:

In Column 2, line 31, "The" should read --This--.
In Column 3, line 53, "key" should read --keg--.
In Column 4, line 25, "in the upper" should read --the upper--.
In Column 6, line 37, "wit" should read --with--.
In Column 7, line 20, "passage 16" should read --passage 116--.
In Column 8, line 55, "flange 158" should read --flange 258--; line 56, "on an" should read --on--.
In Column 9, line 14, "or" should read --of--.
In Column 10, line 4, "is" should read --in--; line 7, "liquid" should read --liquid valve--; line 57, "key" should read --keg--.

Signed and sealed this 29th day of May 1973.

(SEAL)
Attest:

EDWARD M. FLETCHER, JR.
Attesting Officer

ROBERT GOTTSCHALK
Commissioner of Patents